United States Patent
Cazals et al.

(10) Patent No.: US 9,102,395 B2
(45) Date of Patent: Aug. 11, 2015

(54) MULTIFUNCTIONAL PROPULSIVE SYSTEM FOR AN AIRPLANE

(75) Inventors: Olivier Cazals, Daux (FR); Jaime Genty De La Sagne, Toulouse (FR)

(73) Assignee: Airbus Operations S.A.S. (FR)

( * ) Notice: Subject to any disclaimer, the term of this patent is extended or adjusted under 35 U.S.C. 154(b) by 1112 days.

(21) Appl. No.: 12/789,761

(22) Filed: May 28, 2010

(65) Prior Publication Data

US 2011/0030339 A1 Feb. 10, 2011

(30) Foreign Application Priority Data

May 29, 2009 (FR) ..................... 09 53557

(51) Int. Cl.
| | | |
|---|---|---|
| F02K 3/02 | (2006.01) | |
| F02K 1/00 | (2006.01) | |
| F02K 1/54 | (2006.01) | |
| B64C 29/00 | (2006.01) | |
| B64C 15/02 | (2006.01) | |
| B64D 35/04 | (2006.01) | |
| F02K 1/58 | (2006.01) | |
| F02K 1/60 | (2006.01) | |
| F02K 1/76 | (2006.01) | |
| F02K 1/12 | (2006.01) | |
| F02K 1/70 | (2006.01) | |
| F02K 1/72 | (2006.01) | |

(52) U.S. Cl.
CPC ............... *B64C 15/02* (2013.01); *B64D 35/04* (2013.01); *F02K 1/008* (2013.01); *F02K 1/58* (2013.01); *F02K 1/60* (2013.01); *F02K 1/763* (2013.01); *F02K 1/12* (2013.01); *F02K 1/1223* (2013.01); *F02K 1/70* (2013.01); *F02K 1/72* (2013.01); *Y02T 50/671* (2013.01)

(58) Field of Classification Search
CPC ............... F02K 1/72; F02K 1/70; F02K 1/12; F02K 1/1223; F02K 1/60; Y02T 50/671; B64C 17/01; B64C 17/80; B64C 5/08
USPC ............ 60/226.2, 228, 233; 244/99.1, 99.12, 244/113, 110 A–110 D
See application file for complete search history.

(56) References Cited

U.S. PATENT DOCUMENTS

| | | | | |
|---|---|---|---|---|
| 4,147,027 | A * | 4/1979 | Greathouse | 60/226.2 |
| 6,938,408 | B2 * | 9/2005 | Lair | 60/226.2 |
| 2002/0158146 | A1 * | 10/2002 | Lair | 239/265.19 |
| 2004/0068977 | A1 * | 4/2004 | McKay | 60/226.2 |

* cited by examiner

*Primary Examiner* — Lindsay Low
*Assistant Examiner* — Syed O Hasan
(74) *Attorney, Agent, or Firm* — Lerner, David, Littenberg, Krumholz & Mentlik, LLP

(57) ABSTRACT

A propulsive system for aircraft that has a jet engine and a nacelle surrounding the aforementioned jet engine. The nacelle has a front section fixed relative to the jet engine, and a rear extremity behind the front section, and has a rear section with two petals hinged relative to the front section. Each of the two petals in a position called zero-setting forms an extension of the front section of the nacelle in which the inside and outside surfaces of the petals and, respectively, determine the aerodynamic forms of the rear section, which are in geometric continuity with the inside and outside surfaces and, respectively, that determine the aerodynamic forms of the front section. The petals can be set individually at a positive or negative setting angle to put into play the reverser, APU, air brake, vectorial, and taxiing modes of the propulsive system.

12 Claims, 4 Drawing Sheets

MULTIFUNCTIONAL PROPULSIVE SYSTEM FOR AN AIRPLANE

CROSS-REFERENCE TO RELATED APPLICATIONS

This application claims priority to and the benefit of French Application No. 09 53557 filed on 29 May 2009, the disclosures of which are incorporated by reference in its entirety.

BACKGROUND

The aspects of the disclosed embodiments relate to the field of the propulsion of transport aircraft such as civilian transport aircraft.

More particularly, the aspects of the disclosed embodiments relate to a turbojet engine propulsive system that can perform various functions complementary to propulsion.

For reasons of optimization of propulsion and in particular for reasons of weight, in the case of current aircraft such as civilian aircraft and military transport aircraft, there are frequent attempts to use the engines employed for the propulsion of the aircraft for other functions performed by other systems, either to complement these systems or to substitute for them more or less totally.

Thus, the propulsion engines on very many aircrafts are used to supplement braking when the aircraft lands.

The jet engines provided with this capability of braking make use of a so-called thrust reverser device, which deflects the blast of the jet engine when it is deployed and creates a thrust directed toward the rear, which participates in the braking.

In the high-dilution jet engines currently common on civilian and military jet transport aircraft, the thrust reversers act only on the secondary flow, blocking the secondary stream and orienting the flow of air toward the sides and toward the front. So-called grid reversers and petal reversers are known to exist, which show only two used positions: the retracted position in which the jet engine thrust is not modified and the deployed position for which the thrust is reversed.

This configuration of reversers has the defect of not acting on the primary flow of the jet engine, which consequently continues to exert thrust toward the front, which to that extent reduces the efficacy of the reversers, unless supplementary means are utilized.

Furthermore, such reversers in the retracted position by their imperfections cause pressure losses in the stream of secondary flow, which affects the propulsive output and accordingly necessitates great design and control efforts in operation to limit the losses of output.

With single-flow or limited dilution jet engines, it is known how to use clamshell thrust reversers in which two hinged half-shells are placed behind the jet output of the jet engine.

In the retracted position of the reverser, the two half-shells are spread apart, so that the jet of the jet engine passes between the half-shells without being perturbed, and in the deployed position of the reverser, the two half-shells are brought together into contact with one another so as to block the jet of the jet engines and to deflect it to the sides, or toward the top and bottom, and toward the front.

Such an example of clamshell thrust reversers corresponds to those of the Concorde aircraft.

Although it is used less frequently, it is also known how to use a propulsion engine to function as an auxiliary power group to supply the aircraft on the ground with energy and air.

In some cases, the electrical generators and the air intakes used by the aircraft in flight are also used on the ground with the engine functioning for it when no external energy source is available.

For example, this is the case with turboprop aircraft in which one of the turbojet engines is placed in operation on the ground with the propeller immobilized by a propeller brake in a so-called "hotel mode."

In the case of turbojet engines, it was considered replacing the auxiliary power group generally installed in the rear section of the fuselage by a turbine that has an "auxiliary power group or APU" operating mode, in particular with the aircraft parked on the ground, and a "propulsion" operating mode, in particular at takeoff or in flight.

Depending on whether this rear turbine is of small or comparable size, or greater than those of the propulsion engines, it is considered as an APU with an optional propulsive function, or as a propulsion jet engine with an operating mode as auxiliary generator.

This type of solution, which does not seem to have found application up to now on a commercial turbojet aircraft, has the drawback of requiring a turbine; in practice a jet engine, specifically adapted to this mixed function, and the solution proves to be disadvantageous from the point of view of weight balance and from an economic point of view.

Accordingly, the current solutions are limited in use, and their performance is adversely affected by the weight balances and unfavorable outputs, and by the complex and costly installations.

SUMMARY

To improve the possibilities of propulsion by turbojet engines of aircraft, the disclosed embodiments propose a propulsive system with extended capabilities.

The propulsive system of the disclosed embodiments intended to be mounted on an aircraft has a jet engine and a nacelle surrounding the jet engine.

The nacelle itself has a front section on the one hand, principally a section fixed relative to the jet engine during the operation of the propulsive system where the movable parts are accessories, between an air inlet in the front in the direction of motion of the aircraft, and a rear extremity of the front section in the rear, and on the other hand behind the rear extremity of the front section it has two petals hinged relative to the front section.

Each of the two petals in a so-called zero-setting position forms an extension of the front section of the nacelle in which the inside and outside surfaces of the petals determining the aerodynamic forms of the rear section of the nacelle, are in geometric continuity with the inside and outside surfaces determining the aerodynamic forms of the front section of the nacelle.

Thus the petals that are hinged participate in the structure and form of the nacelle when they are at a zero setting, extending the front section of the nacelle toward the rear by a length essentially equal to the length of the petals.

To modify the rear geometry of the nacelle to respond to the needs of specific operations of the propulsive system, and to control the position of the petals in rotation simply and reliably at the rear of the front section of the nacelle, each of the petals is hinged around an axis essentially in a plane perpendicular to the longitudinal axis of the propulsive system and of the jet engine, a plane located behind the rear extremity of the front section of the nacelle to permit the setting of the petals in the two directions without interfering with the front section of the nacelle.

To modulate the thrust as a function of needs, each petal has the following controlled positions:

the position of zero setting that forms a conventional nacelle geometry in a configuration corresponding to a cruising configuration, and;

at least one partial positive setting position of the two petals in which a part of each petal, called the anterior petal, in front of the axis of rotation of the petal, is spread away from the axis of the propulsive system toward the outside of the nacelle, and in which a part of the petal called the posterior petal, behind the axis of rotation of the petal, is brought close to the axis of the propulsive system without being in contact with the other petal, in a configuration that does not totally close the two petals and maintains an axial opening of the nacelle behind the propulsive system and/or;

at least one positive setting position of one of the two petals combined with a negative setting position of the other petal in which the anterior petal in front of the axis of rotation is brought close to the axis of the propulsive system and in which the posterior petal is at a distance from the axis of the propulsive system, so that at least a portion of the internal dynamic flow of the front section of the nacelle passes outside of the petal, beside an exterior face of the petal, with this asymmetric configuration of the petals having the effect of deflecting the jet of the jet engine relative to the axis of the propulsive system, and accordingly the resultant thrust.

Preferably, the petals also have at least one controlled position in which the petals have positive settings, which ensures the mutual contact of the petals at junction surfaces of the posterior petals, to impede the axial flow of the jet of the jet engine toward the rear.

This ensemble of controlled positions permits modulating the resultant thrust or the drag of the propulsive system in module and direction by mechanical means, without acting on the jet engine controls.

To equilibrate the operation of the propulsive system, the petals advantageously are essentially symmetrical relative to a plane of symmetry of the jet engine parallel to the axis or axes of rotation of the petals, and also advantageously the controlled positions of the petals are symmetrical, other than in the zero-setting position while cruising, in the modes of operation of the propulsive system intended to obtain a thrust toward the rear in a so-called reverser mode, or intended to obtain weak or essentially limited thrust in an accessory entrainment mode of the jet engine, called the APU mode.

To obtain thrust with a significant and controllable lateral component, the controlled positions of the petals are reversed, in other words one petal is subjected to a negative setting and the other petal is subjected at the same time to a positive setting with a setting angle essentially equivalent in module and variable in function of a desired transverse component of the thrust, in a vectorial mode.

To permit the negative setting of the petals, the anterior petal of each petal is truncated in its sections close to the axis of rotation of the petal in question, by a sector at least equal to the maximum angle of negative setting desired for the petal in question, and in which the fixed extensions of the front section of the nacelle arranged behind the rear limit of said front section of the nacelle, provide the continuity of the nacelle at the truncated sectors of the anterior petals when the petals are at zero setting.

To permit simultaneous rotation of the two petals without relative slippage, the petals are preferably hinged around a common axis, essentially in a plane of symmetry of the propulsive system.

To actuate the petals effectively and reliably, the petals are mounted to rotate on shafts carried by structural beams integral with fittings, beneficially annular fittings adapted to the geometry of the nacelle, fastened on the front section of the nacelle, and the petals are moved by actuators acting at a first extremity on supports integral with the petals and at a second extremity on the annular fittings.

The propulsive system of the disclosed embodiments preferably has means for hooking to a support post that permits conventional installation on an aircraft, with the propulsive system of the disclosed embodiments, as the case may be, being able to substituted for the existing propulsion of an aircraft with a minimum modification of the aircraft.

The propulsive system is advantageously controlled by acting on the setting of the petals, in coordination with the conventional regulation of the operation of the jet engine, as the case may be, for various functions that permit simplification of the existing systems by supplementing them or substituting for them, or by forming functional redundancies that permit simplification of the design of the conventional systems.

Thus the means for controlling and driving the positions of the petals of the propulsive system ensure the operation of the propulsive system to ensure, as a function of the needs of the flight phase in question, on the one hand a cruising mode in which the petals are driven with a zero setting, regardless of the mode of operation of the jet engine, and on the other hand at least one of the modes of operation in which the petals are controlled with non-zero settings:

a reverser mode in which the petals are controlled with a maximum positive setting to place the two petals in contact when the jet engine is in a thrust reversal operation;

an air brake mode in which the petals are driven to variable positions intermediate between the zero-setting position and maximum positive setting, and in which the jet engine is in a mode of reduced thrust operation;

an APU mode in which the petals are driven into intermediate positions determining a resultant thrust of the propulsive ensemble that is essentially zero or weak;

a vectorial mode in which the petals are driven into positions with settings of opposite signs to deflect the jet of the jet engine of the propulsive ensemble, regardless of the mode of operation of the jet engine;

a taxiing mode into which the petals are driven when the aircraft is moving on the ground, with positions variable between the zero-setting position and maximum positive setting, to modulate the thrust of the propulsive ensemble rapidly, independently of the operating regime of the jet engine.

The disclosed embodiments also address an aircraft that has one, two, or multiple propulsive systems according to the disclosed embodiments, which permits an aircraft to improve its operating performance by increased capabilities and simplified systems.

The disclosed embodiments also relate to a nacelle adapted to the needs of such an aircraft propulsive system.

BRIEF DESCRIPTION OF THE DRAWINGS

The propulsive system pursuant to the disclosed embodiments is described with reference to the Figures, which show schematically.

DETAILED DESCRIPTION

Figure 1:
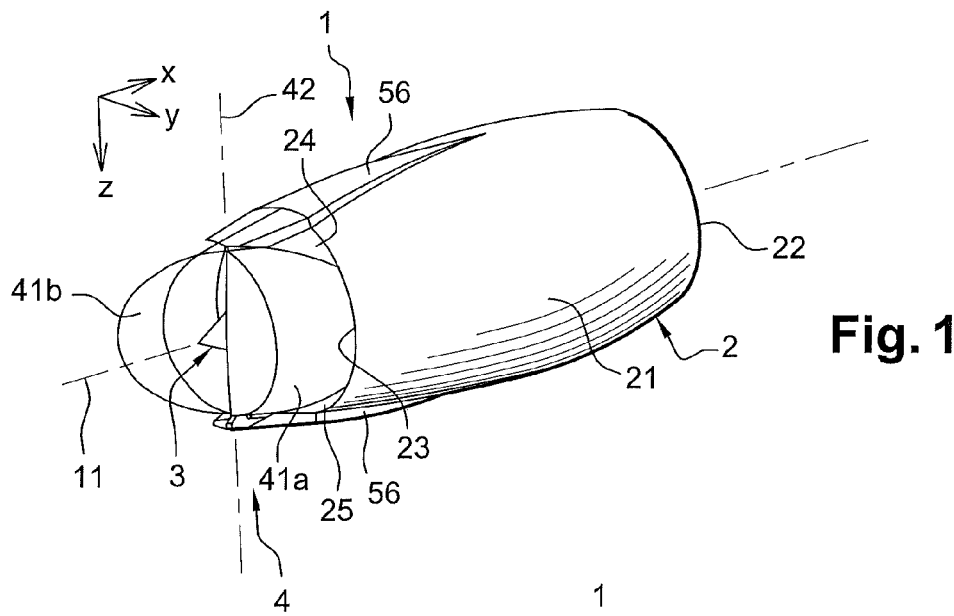
FIG. 1: a perspective view of a propulsive ensemble pursuant to the disclosed embodiments, petals in cruising position.

FIG. 1 illustrates a propulsive device 1 pursuant to the disclosed embodiments that has principally a jet engine 3, of which only an extreme rear part is visible in the illustration, enveloped by a nacelle 2.

The propulsive device 1 is associated for the needs of the description with a conventional frame of reference defined by three orthogonal directions:

an X direction parallel to a longitudinal axis 11 of the propulsive device oriented positively toward the front of the device;

a Z direction perpendicular to the X direction and oriented positively downward;

a Y direction perpendicular to a plane XZ determined by the X and Z directions, oriented positively toward the right.

The directions thus defined correspond essentially to angular settings almost seated on or skimming the principal directions of an aircraft frame of reference on which said propulsive ensemble is mounted or intended to be mounted.

The expressions relative to position or direction in the description accordingly have in common the meanings that they are in a frame of reference of the aircraft, specifically:

in front of or toward the front signifies the direction of positive X, and behind or toward the rear in the direction of negative X;

below or downward signifies in the direction of positive Z, and above or upward in the direction of negative Z;

on the right or toward the right signifies in the direction of positive Y, and on the left or toward the left in the direction of negative Y, on a side signifying either the side of positive X or negative X, depending on the case.

Figure 2:
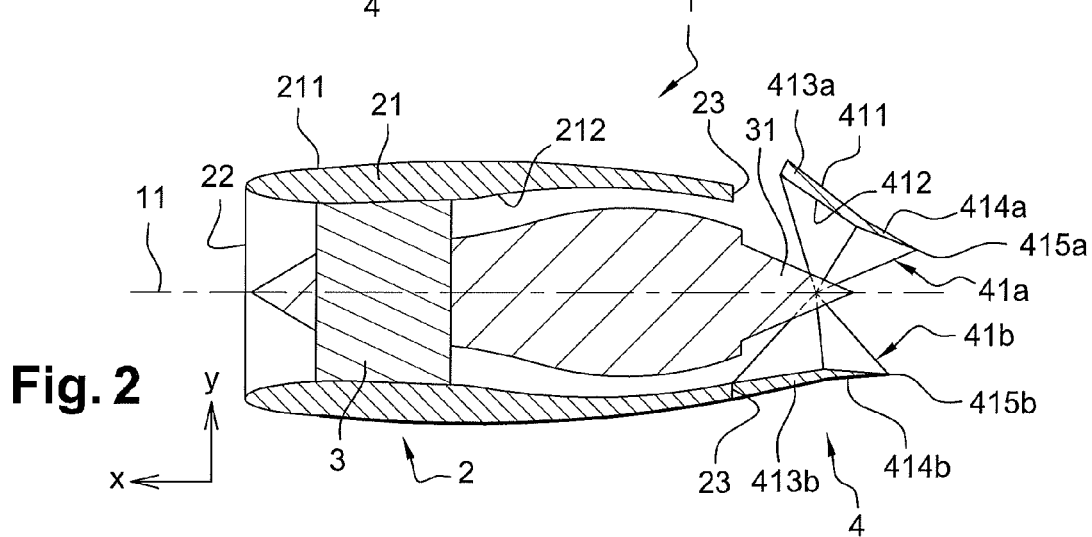
FIG. 2: a profile cross-sectional view of the propulsive ensemble of FIG. 1, a zero-setting petal on the lower half-view, and a petal with positive setting on the upper half-view.
Figure 3:
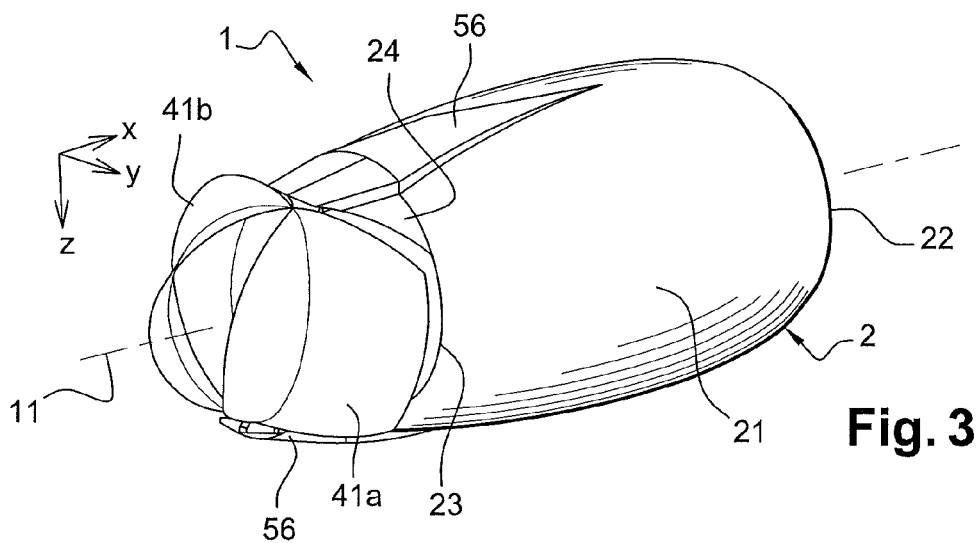
FIG. 3: a perspective view of the propulsive ensemble of FIG. 1 with petals partially set positively.

As is apparent in FIG. 1 in perspective and in FIG. 2 in cross section, the nacelle 2, with the general outside form of essentially a barrel of revolution, which surrounds the engine 3 in conventional fashion, has a principal front section 21 fixed relative to the engine 3, and a rear section 4 that has movable elements.

The front section 21 of the nacelle is similar to a conventional jet engine nacelle, and its structure around the jet engine determines exterior and interior aerodynamic forms 211 and 212, respectively, of the propulsive device 1 between an air intake 22 at the front of the nacelle 2 and a rear extremity 23 in an exhaust nozzle zone of the propulsive device 1.

When the propulsive system is in operation, the front section 21 of the nacelle is advantageously devoid of movable elements, except for any secondary elements not shown.

In particular in the front section 21, the nacelle is advantageously devoid of a thrust reverser, thus avoiding misalignments of movable parts that would be associated with thrust reversers, and to keep aerodynamic flow on the exterior and interior surfaces of the nacelle, 211 and 212 respectively, as laminar as possible.

The rear section 4 of the nacelle 2 has two movable elements 41a, 41b, called petals.

The petals 41a, 41b in a position shown in FIG. 1 and in the cutaway view of FIG. 2, form a rear extension of the front section 21 of the nacelle 2, an extension that extends the nacelle behind the rear extremity 23 of said front section of the nacelle.

In this position, which is designated zero-setting, $\hat{A}=0$, exterior and interior surfaces, 411 and 412 respectively, of the petals 41a, 41b are geometrically essentially in continuity with the exterior and interior surfaces 211 and 212, respectively, of the front section 21 of the nacelle, forming the rear section of an exhaust nozzle for the gasses passing through the jet engine 3.

The petals 41a, 41b are hinged to rotate around an essentially vertical axis 42 in a vertical plane of symmetry XZ of the propulsive system, in other words essentially parallel to the Z direction.

The position of the axis of rotation 42 along the longitudinal X direction is situated essentially behind the rear extremity 23 of the front section 21 of the nacelle, so that when a petal 41a, 41b is rotated by a non-zero positive setting angle $\hat{A}$ relative to the zero-setting position around the axis of rotation 42, as shown in the top cutaway view of FIG. 2, a part 413a or 413b, respectively, of the petal located in front of the axis of rotation, called the anterior petal, is shifted toward the outside relative to the zero-setting position in case of a positive setting angle $\hat{A}$, i.e. it is moved away from the axis 11 of the jet engine, or it is displaced toward the inside relative to the zero-setting position in case of a negative setting angle $\hat{A}$, i.e. moved closer to the axis 11 of the jet engine.

On the contrary, a part 414a, 414b of the petal located behind the axis of rotation 42, called the posterior petal, is brought closer to the axis 11 of the jet engine for a positive setting $\hat{A}$ and is moved away from the axis of the jet engine for a negative setting $\hat{A}$.

In an extreme position of positive setting $\hat{A}$, $\hat{A}max+$, of the petals 41a and 41b, the posterior petals 414a and 414b are in contact at junction surfaces 415a, 415b. The geometry of the posterior petals is such that in this extreme position, the junction surfaces 415a and 415b ensure a geometric continuity of the petals 41a, 41b, which in this position form a continuous baffle at the rear of the nacelle 2.

Figure 4A:
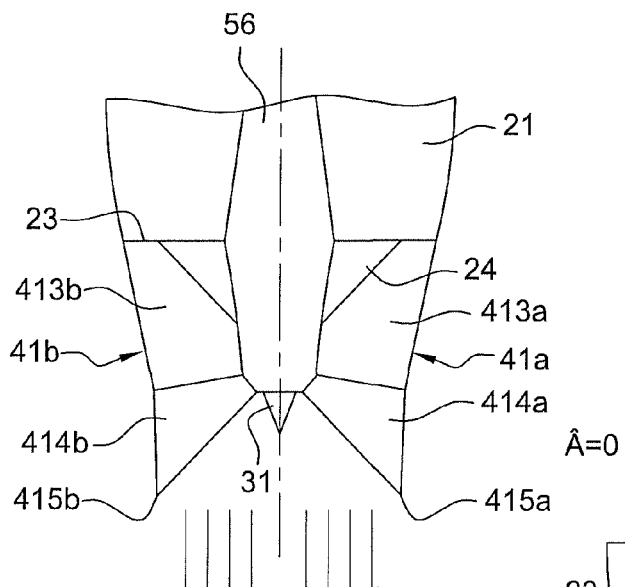
FIG. 4a: an illustration of the cruising mode of operation.
Figure 4B:
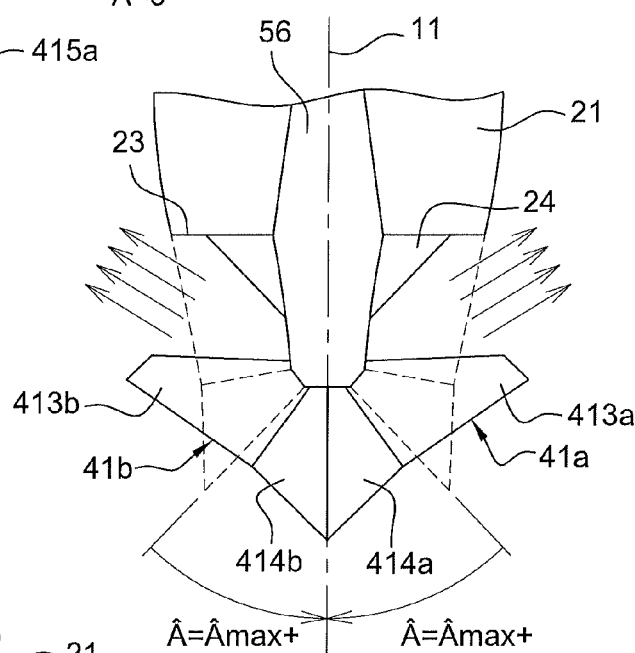
FIG. 4b: an illustration of the thrust reversal mode of operation.

FIG. 4b illustrates a rear zone of the nacelle in a view from above when the petals 41a, 41b are in this extreme position in a symmetrical configuration.

It is evident, as shown in particular in FIG. 2, that the lengths of the nacelle 2 and of the front and rear sections of the nacelle, 21 and 3, respectively, do not interfere mechanically with the rear parts of the engine, in particular with the exhaust cone 31, during settings.

To permit a negative angular excursion of the setting $\hat{A}$ toward the inside, the anterior petals 413a, 413b are truncated in their sections close to the axis of rotation 42 by an angular sector at least equal to a maximum negative angle setting that can be achieved.

Extensions (24, 25) of the front section 21 of the nacelle fixed in operation of the propulsive system are made in the upper and lower sections between the axis of rotation 42 and the rear extremity 23 of the front section of the nacelle in the space left free by the truncated parts of the anterior petals 413a, 413b.

These fixed extensions, an upper extension 24 and a lower extension 25, ensure the continuity of the inside and outside surfaces of the nacelle 2 when the petals are at a zero setting, $\hat{A}=0$ while permitting the motion of rotation of the petals with a negative setting by a suitable geometry of the surfaces of said extensions relative to the petals, for example surfaces of revolution around the axis of rotation 42 of the petals, tightness at said surfaces with the petals being reinforced if needed, for example by slip joints.

The preceding description of the system is not in any way limiting, and one skilled in the art is able to determine suitable forms and dimensions, or variations of embodiments, depending on each particular application.

Thus the longitudinal dimensions along the X direction and the geometry of the posterior petals determine the setting angles Â for which the two petals are contiguous, and consequently the possible angle with which the anterior petals are open.

The forms of the junction surfaces 415a, 415b of the petals are complementary to ensure a relatively continuous junction area. They are advantageously simple and representative of the intersection of the surfaces, for example cylindrical or conical, generatrices of the posterior petals, but if needed they can show more complex forms respecting the criterion of the essentially continuos junction of the petals when they are in contact.

The position along the X direction of the axis of rotation 42 of the petals behind the rear extremity 23 of the front section 21 of the nacelle determines the length along the X direction of the anterior petals 413a, 413b.

In combination with the geometry of the posterior petals, which determines the possible setting angles Â, the position of the axis of rotation 42 accordingly also determines the distance by which the anterior petals are able to be displaced toward the outside of the nacelle.

In an example of embodiment not shown, each petal is hinged around a distinct axis of rotation, with the two corresponding axes being parallel to and a priori close to the same position along the X direction. Such an arrangement permits arriving at simplified kinematics and structure compared with a solution with an axis common to the two petals but to the detriment of the simplicity of the junction surfaces 415a, 415b when the two petals have to be kept in contact at said junction surfaces with different settings of the two petals.

However, an axis 42 of rotation common to the two petals 41a, 41b has the advantage of permitting common rotation of said petals without any sliding between the contact surfaces between said petals.

Advantageously, as shown in the Figures, the two petals 41a, 41b are essentially symmetrical relative to a vertical plane of symmetry XZ of the nacelle.

In an embodiment not shown, the two petals are not symmetrical, for example because of a proximity element toward which the intensity of a blast from the jet engine has to be reduced, and in this case the geometry, particularly the geometry of the rear extremity 23 of the front section 21 of the nacelle, and of the upper and lower extensions of the posterior petals 24 and 25, respectively, are adapted.

The propulsive system as described will be better understood by considering the manner in which said system is put to use for the needs of an aircraft.

In a first mode of operation, the propulsive system is used as a conventional engine.

In this mode, called the cruising mode, illustrated in FIG. 4a, the petals are at zero setting, Â=0, and the propulsive system 1 delivers the thrust of the jet engine 3 exclusively toward the front, regardless of the operating regime of the jet engine, with the orientation of the air ejected by the jet engine being materialized in FIG. 4a by the arrows in the rear section of the propulsive system.

This cruising mode is that used in most of the phases in which the aircraft is found in flight: climbing, cruising and descending, and during takeoff.

In a second mode of operation, the propulsive system is used in a dynamic braking function by generating a thrust component in reversed direction compared to the thrust when cruising.

In this mode, called the reverser mode, shown in FIG. 4b, the petals are set positively at a maximum value Âmax+ so as to be in contact with one another, advantageously but not necessarily in a symmetrical manner, and the propulsive system 1 delivers the thrust of the jet engine 3 essentially toward the back, as is generally desired in a thrust reverser.

In this situation, the air ejected by the jet engine is deflected laterally by the petals partly toward the front along orientations materialized in FIG. 4b by the arrows in the rear section of the propulsive system.

The reverser mode is used principally while taxiing on landing to participate in the braking of the aircraft, with the jet engine regime being suitable for the desired reversed thrust.

In a third mode of operation, the propulsive system is used in an energy-generating function on the ground, i.e. as an auxiliary power group.

Figure 4C:
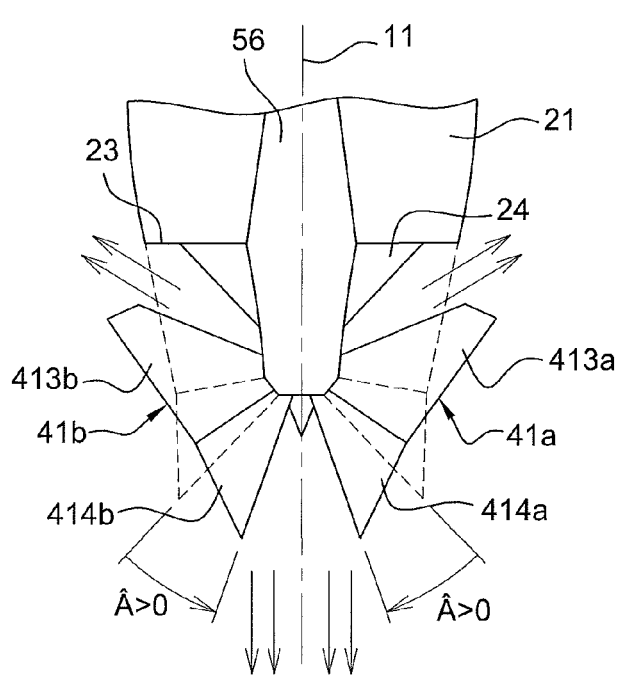
FIG. 4c: an illustration of the APU mode of operation.

In this mode, called the APU mode, shown in FIG. 4c, each of the petals is partially set at a positive angle Â, so that part of the jet from the jet engine 3 is ejected between the two petals in the backward direction of negative X, and the other part of the jet from the jet engine 3 is sent by the petals to the sides and toward the front of the propulsive system, as shown in FIG. 4c by the arrows materializing the directions of the air ejected by the jet engine at the rear of the propulsive system.

The position of each petal, i.e. the value of the setting angle Â, is defined in this mode by calculation or by experimentation, so that the resultant thrust of the propulsive system is essentially zero or at least reduced as much as possible, and especially far below the thrust that would be delivered by the propulsive system if the petals were left at zero setting.

The separation of the jet engine jet into several sections and the mask formed by the petals participate in reducing the noise level emitted to the surroundings when the aircraft is on the ground in APU mode.

The APU mode is used principally on the ground when the aircraft needs energy, particularly electrical energy and conditioned air, without needing propulsion, and the regime of the jet engine 3 can be adjusted to the needs of the generators driven by said jet engine, without fear of excessive thrust that could cause unwanted motion of the aircraft on the ground.

In a fourth mode of operation, the propulsive system is used in an air braking function.

Figure 4D:
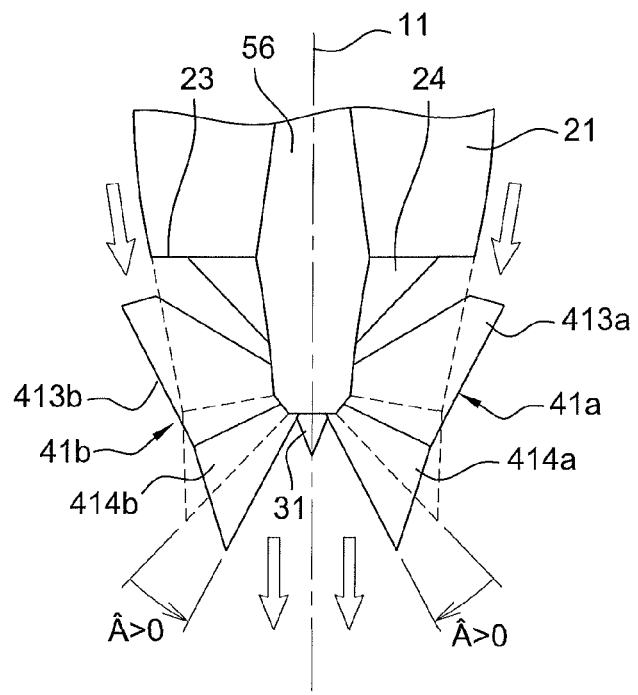
FIG. 4d: an illustration of the air brake mode of operation.

In this mode, called the air braking mode, shown in FIG. 4d, the petals are partially set at a positive angle Â and the jet engine operates in a reduced regime so that the drag of the nacelle is increased significantly while the engine delivers no thrust or only little.

In FIG. 4d, the arrows symbolize the external aerodynamic flow that interferes with the petals in the air braking function.

The aerodynamic drag of the nacelle 2 is modulated along the setting angles Â given to the petals, which are spread and project more or less toward the outside depending on the setting angles.

The air braking mode is used principally during the descent or approach phases of flight to act on the drag of the aircraft and to modulate the slope or speed of the aircraft when the engines are at reduced thrust.

In a fifth mode of operation, the propulsive system 1 is used to create a lateral component of thrust, in other words a thrust that has a component along the Y direction.

Figure 4E:
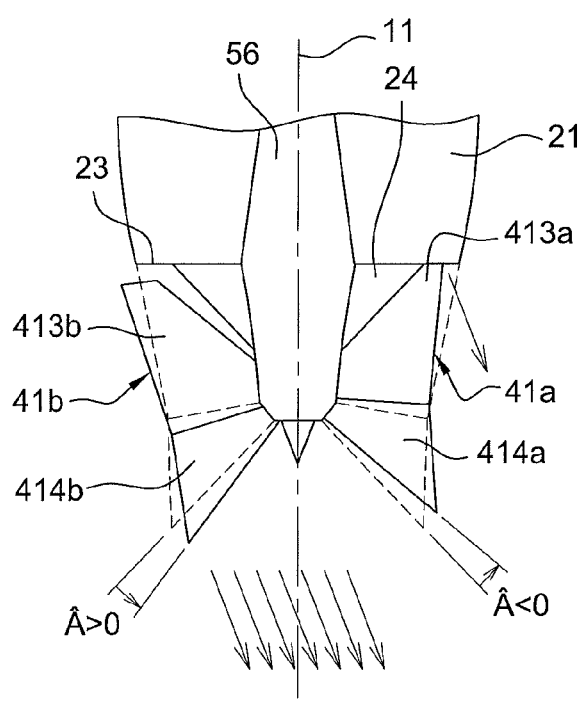
FIG. 4e: an illustration of the vectorial mode of operation.

In this mode of operation, called the vectorial mode, shown in FIG. 4e, one of the petals, 41a in the example of FIG. 4e, is oriented with a positive setting angle Â, and the other petal, 41b in the illustrated example, is oriented with a negative setting angle Â.

In this mode of operation, some of the air ejected by the jet engine, materialized in FIG. 4e by the arrows at the rear section of the propulsive system, circulates on the outside of the petal that has a negative setting, and the rest of this air that passes between the petals is deflected in proportion to the coordinated settings of the petals.

The setting angles Â in question are relatively limited so as not to act too heavily on the module of the thrust delivered by the propulsive system, but to act principally on the orientation of the jet from the jet engine and accordingly of the lateral thrust delivered.

The vectorial mode is advantageously used to equilibrate the aircraft in case of a condition of asymmetric thrust in flight, in particular in case of the loss of an engine on an aircraft that has multiple engines offset relative to a vertical plane of symmetry of the aircraft, which provides the functions of a vertical rudder and its directional control, at least in part.

The propulsive system of the disclosed embodiments permits other modes of operation that can be considered as intermediate modes or derivatives of the preceding modes.

Settings of the petals intermediate between those of the cruising and APU modes permits managing a modulated thrust toward the front without the need to modify the engine regime, and settings of the petals intermediate between those of the APU and reverser modes permits managing a modulated thrust toward the rear without the need to modify the engine regime.

It is accordingly possible to modify the resultant thrust of each propulsive system of an aircraft by acting on the position of the petals, a position that is quickly modified by the actuators, with an immediate effect on thrust, while modifying the thrust by action on the jet engine regulators is much slower (at least by an order of magnitude).

This possibility in a taxiing mode permits driving an aircraft while taxiing on the ground without the necessity of using wheel brakes by modulating the overall thrust toward the front and/or toward the rear to control the taxiing speed, and asymmetrically between the propulsive systems on the left and right sides of the aircraft to help to steer in curved taxiing trajectories.

Figure 5:
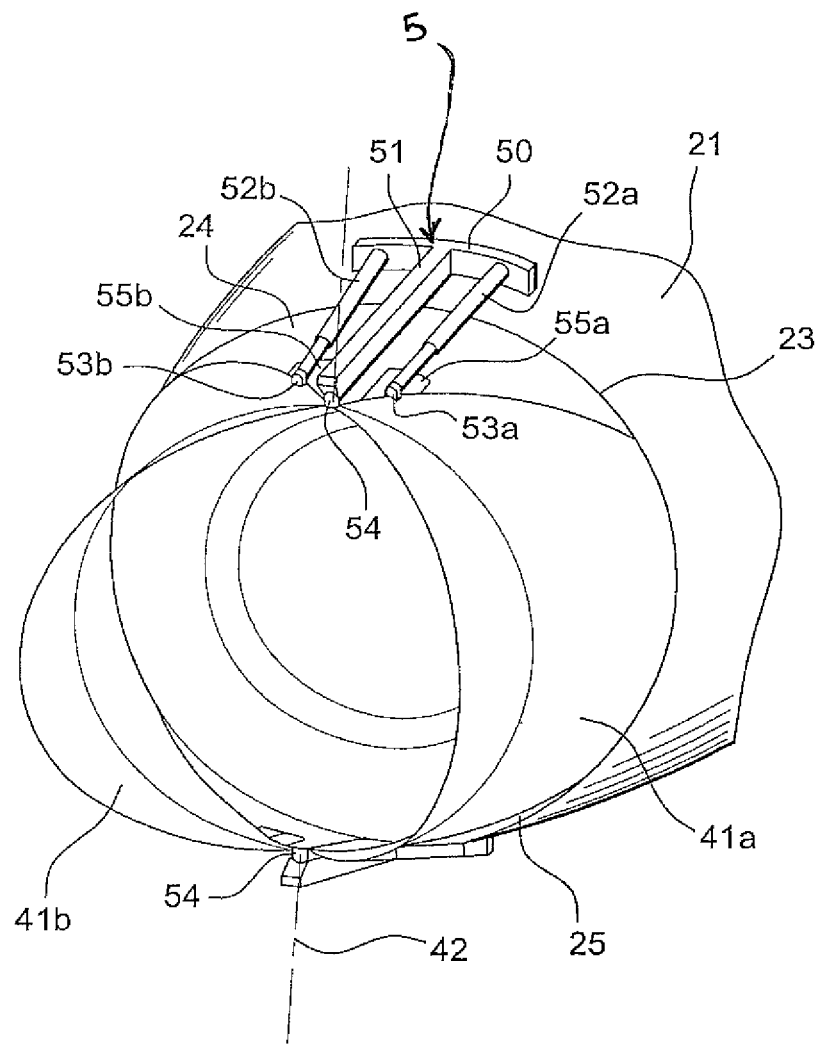
FIG. 5: a view of the principle of a setting system.

In an embodiment shown in FIG. 5, the two petals 41a, 41b are actuated by a setting system 5 that has means of expressing forces on the axis 42 in the upper part and lower part of the propulsive system.

For example, in the upper part of the propulsive system as illustrated in FIG. 5, each petal 41a, 41b is actuated individually by at least one driver 52a, 52b respectively, resting at a first end on a pickup yoke 53a, 53b, respectively, of the petal integral with the petal 43a, 43b, respectively, at a point distant from the axis of rotation 42 of the petal, and a second end on an annular fitting 50 integral with a structure of the front section 21 of the nacelle.

In a preferred form of this embodiment, the petals 41a, 41b are integral with an upper shaft 54 of the axis of rotation 42 of the petals, said shaft being carried by a structural beam 51, itself integral with the annular fitting 50.

In the lower part of the propulsive ensemble, an equivalent system, with or without a driver, provides for maintaining a lower rotational shaft of the petals 41a, 41b.

Drivers are preferably also provided for in the bottom part for symmetrical operation of the petals in terms of forces.

The setting system 5 is preferably placed on the outside of the natural forms of the nacelle 2 defined by the exterior surface 211 of the nacelle, considering in particular the small thicknesses of the walls of the nacelle in its rear section. Openings 55a, 55b in the upper extension 24, and their equivalents in the lower extension 25 if necessary, ensure free passage for the pickup yokes 53a, 53b and screw jacks of the drivers 52a and 52b during the rotation of the petals.

The setting system 5 is preferably protected in a cover 56 to minimize the impact on the aerodynamics of the nacelle.

The cover 56 in a solution not shown is advantageously associated with a support post of the propulsive system or with aerodynamic covers of such a post.

Details of design familiar to one skilled in the art, for example methods of locking, means for measuring and control, structural or system redundancies, are not shown.

The drivers can be of different types, for example hydraulic, electrical, or others, and are advantageously controlled by a thrust control system that integrates the different operating signals of the aircraft, including those of the propulsive system itself, and the orders of pilots.

One skilled in the art will understand that the propulsive system of the disclosed embodiments can be fastened beneath the wing of an aircraft like conventional jet engines, and such mounting is not described.

When it is fastened beneath an aircraft wing, the petals 41a, 41b in the different modes in which the jet of the jet engine is deflected, deflect the jet of the jet engine 3 laterally so that the wing is not affected by the jet, whose temperature because of the deflection of the hot primary flow could damage certain structures unless disadvantageous precautions are taken.

Also, the jet being deflected laterally while the jet engine is generally close to the ground, permits avoiding the raising of particles, powders, grit, snow, etc., which could alter the operation of the jet engine by being ingested by said jet engine of the propulsive system.

The orientation of the propulsive system 1 shown in FIG. 1 corresponds to such an arrangement on an aircraft.

The propulsive system described can also be installed in a rear section of the fuselage or in a rudder, if the rear section 4 of the nacelle is sufficiently disengaged from the structures of the aircraft.

In a similar form not described, the propulsive system is fastened to a post laterally at the rear of an aircraft fuselage.

In this type of assembly, the propulsive system 1 described is preferably rotated by a quarter of a turn around the axis 11 of said propulsive system relative to the illustration of FIG. 1, so that the axis 42 of the petals is horizontal in the frame of reference of the aircraft.

This rotation permits avoiding interference between the fuselage and the petals, even when the nacelles are very close to the fuselage and the jet of the jet engine is deflected upward and downward by the petals at zero-setting, preventing the jet from being directed toward the structure of the fuselage.

In this case, the vectorial mode cannot be used for lateral control, which is not a drawback because of the low dissymmetry of the thrust in case of a jet engine failure when the jet engines are close to the plane of symmetry of the aircraft, but on the contrary it can be used to accomplish longitudinal control in pitch.

Intermediate positions are also possible, in which the propulsive ensemble is set at an intermediate angle around the longitudinal axis 11 along the X direction between the position shown in FIG. 1, axis of rotation of the petals essentially vertical, and a position at 90 degrees, axis of rotation of the petals essentially horizontal.

In this case, in the vectorial mode it is possible to combine the propulsive systems with different angular settings, advantageously symmetrical, to create a resultant thrust that can be oriented to obtain a component in any desired direction of the YZ plane of the aircraft, and to permit an attitude control mode of the aircraft around its center of gravity by the orientable thrust.

The disclosed embodiments accordingly relate to an aircraft that has one or more propulsive systems as just described, and a nacelle that corresponds to such propulsive systems.

The propulsive system of the disclosed embodiments permits the implementation of a propulsive system that optimally combines numerous functions devoted to different systems in the architectures of conventional aircraft.

Thus the propulsive system of the disclosed embodiments permits filling the function of an auxiliary power group with any of the jet engines of the aircraft, and accordingly doing without the auxiliary group, heavy and costly equipment, generally mounted on the aircraft for use that is always punctual.

The propulsive system of the disclosed embodiments provides aerodynamic braking capabilities in flight that permits limiting, if not eliminating, the conventional air brakes and their drivers.

The propulsive system of the disclosed embodiments permits compensating for the asymmetric thrust in case of the loss of a jet engine, and reduces the constraints on the size of the rudder and its directional control, allowing a smaller and lighter rudder.

In certain arrangements, the propulsive system of the disclosed embodiments ensures principal or auxiliary control of the motions of the aircraft around the center of gravity and simplification of the conventional flight control systems.

The propulsive system provides for greater reversed thrust than on the conventional systems by also reversing the primary flow of the jet engine, without calling upon complex complementary systems, and accordingly improves landing performance.

The propulsive system permits simply and rapidly modulating the thrust of the system, which allows taxiing of the aircraft with minimal use of the brakes, in particular avoiding heating of these brakes before takeoff.

The relatively simple mechanisms for driving the petals permits obtaining these benefits of the disclosed embodiments in a reliable fashion, without significant weight penalty and with a clean nacelle on the aerodynamic level in its most sensitive part.

The propulsive system also allows mounting on an aircraft similarly to known assemblies beneath wings or on the sides of a fuselage, and can accordingly be simply adapted to any type of aircraft turbojet propulsion architecture, with each engine being advantageously replaced by a propulsive system of the disclosed embodiments.

The invention claimed is:

1. A propulsive system for an airplane having a jet engine and a nacelle surrounding said jet engine,
    wherein said nacelle has a front section between an air inlet in the front in the direction of motion of flight and a rear extremity of the front section at the rear with said nacelle having a rear section behind the rear extremity forming an extension of the front section of the nacelle,
    wherein said rear section is formed by first and second petals hinged relative to the front section with interior and exterior surfaces of said petals in a zero setting position each being in geometric continuity with the interior and exterior surfaces determining the aerodynamic forms of the front section;
    wherein the first and second petals are each hinged around an axis essentially in a plane perpendicular to a longitudinal axis of the propulsive system and of the jet engine, and are located behind the rear extremity of the front section of the nacelle so that the position of the axis relative to each of the first and second petals determines an anterior section, located in front of the axis of rotation, and determines a posterior section, located behind the axis of rotation; and
    wherein the system further comprises a means of controlling and driving configured to drive the first and second petals to at least one stationary operational intermediate position between a fully open position and a fully closed position and to maintain the first and second petals in the at least one stationary operational intermediate position, wherein the posterior sections of the first and second petals are spaced from the axis of the propulsive system such that a part of a jet from the jet engine is ejected between the posterior sections and another part of the jet from the jet engine is ejected by the anterior sections of the first and second petals to first and second sides and toward the front of the propulsive system.

2. The propulsive system of claim 1 wherein the petals have the following commanded positions:
    the zero-setting position;
    at least one position with a partial positive setting of the first and second petals in which partial positive setting the anterior petal of each of the first and second petals is spaced from the axis of the propulsive system toward the outside of the nacelle and in which the posterior petal of each of the first and second petals is brought closer to the axis of the propulsive system toward the inside of the nacelle, without the first and second petals being in contact with one another, and
    at least one position with positive setting of one of the first and second petals combined with a position with negative setting of the other petal in which negative setting the anterior petal in front of the axis of rotation is brought closer to the axis of the propulsive system toward the inside of the nacelle and in which the posterior petal behind the axis of rotation is spaced from the axis of the propulsive system toward the outside of the nacelle.

3. The propulsive system of claim 2 wherein the first and second petals have at least one commanded position in which the first and second petals have positions with positive settings and are in contact at junction surfaces of the posterior petals.

4. The propulsive system of claim 2, wherein the commanded positions of the first and second petals are symmetrical with the zero or positive setting.

5. The propulsive system of claim 2, wherein the commanded positions of the first and second petals are opposite, with one petal having a negative setting and the other petal having a positive setting, of an angle essentially equivalent in module and variable as a function of a desired transverse component of thrust in a vectorial mode.

6. The propulsive system of claim 2, wherein the anterior petal of each of the first and second petals is truncated in the sections close to the axis of rotation, by a sector at least equal to a maximum desired negative setting angle for the corresponding petal, and in which the fixed extensions of the front section of the nacelle, arranged behind the rear limit of the said front section of the nacelle, provide for the continuity of the nacelle at the point of the truncated sectors of the anterior petals when the first and second petals are at zero setting.

7. The propulsive system of claim 1, wherein the form of the first and second petals is essentially symmetrical relative to a plane of symmetry of the jet engine parallel to the axis or axes of rotation of the first and second petals.

8. The propulsive system of claim 1, wherein the first and second petals are hinged around a common axis essentially in a plane of symmetry of the propulsive system.

9. The propulsive system of claim 1, wherein the first and second petals are mounted in rotation on shafts carried by structural beams integral with fittings fastened to the front section of the nacelle, and in which the first and second petals are displaced by drivers acting at a first extremity on supports integral with the first and second petals and at a second extremity on the fittings.

10. The propulsive system of claim 1, wherein the means of controlling and driving is configured to drive the first and second petals in:
   a cruising mode wherein the first and second petals are controlled with a zero setting, regardless of the mode of operation of the jet engine;
   a reverser mode wherein the first and second petals are controlled with a maximum positive setting to place the first and second petals in contact when the propulsive system is in a thrust reversal operation;
   an air brake mode wherein the first and second petals are driven to variable positions intermediate between the zero-setting position and maximum positive setting, and wherein the jet engine is in a mode of reduced thrust operation;
   an APU mode wherein the first and second petals are driven into intermediate positions determining a resultant thrust of the propulsive system that is essentially zero or weak;
   a vectorial mode wherein the first and second petals are driven into positions with settings of opposite signs to deflect the jet of the jet engine of the propulsive system regardless of the mode of operation of the jet engine; and
   a taxiing mode wherein the first and second petals are driven when the aircraft is moving on the ground, with positions variable between the zero-setting position and maximum positive setting, to modulate the thrust of the propulsive system rapidly, independently of the operating regime of the jet engine or to supplement variations of the operating regime of the jet engine.

11. An aircraft with one or more of the propulsive systems, a jet engine and a nacelle surrounding the jet engine,
   wherein said nacelle has a front section between an air inlet in the front in the direction of motion of flight and a rear extremity of the front section at the rear with said nacelle having a rear section behind the rear extremity forming an extension of the front section of the nacelle,
   wherein said rear section is formed by first and second petals hinged relative to the front section with interior and exterior surfaces of said petals in a zero setting position each being in geometric continuity with the interior and exterior surfaces determining the aerodynamic forms of the front section;
   wherein the first and second petals are each hinged around an axis essentially in a plane perpendicular to a longitudinal axis of the propulsive system and of the jet engine, and are located behind the rear extremity of the front section of the nacelle so that the position of the axis relative to each of the first and second petals determines an anterior section of the first petal, located in front of the axis of rotation, and determines a posterior section of the second petal, located behind the axis of rotation; and
   wherein the system further comprises a means of controlling and driving configured to drive the first and second petals to at least one stationary operational intermediate position between a fully open position and a fully closed position and to maintain the first and second petals in the at least one stationary operational intermediate position, wherein the posterior petals of the first and second petals are spaced from the axis of the propulsive system such that a part of a jet from the jet engine is ejected between the posterior petals and another part of the jet from the jet engine is ejected by the anterior petals of the first and second petals to first and second sides and toward the front of the propulsive system.

12. A nacelle for a propulsive system having a jet engine and a nacelle surrounding the jet engine,
   wherein said nacelle has a front section between an air inlet in the front in the direction of motion of flight and a rear extremity of the front section at the rear with said nacelle having a rear section behind the rear extremity forming an extension of the front section of the nacelle,
   wherein said rear section is formed by first and second petals hinged relative to the front section with interior and exterior surfaces of said petals in a zero setting position each being in geometric continuity with the interior and exterior surfaces determining the aerodynamic forms of the front section;
   wherein the first and second petals are each hinged around an axis essentially in a plane perpendicular to a longitudinal axis of the propulsive system and of the jet engine, and are located behind the rear extremity of the front section of the nacelle so that the position of the axis relative to each of the first and second petals determines an anterior section of the first petal, located in front of the axis of rotation, and determines a posterior section of the second petal, located behind the axis of rotation; and
   wherein the first and second petals are in operational communication with a means of controlling and driving configured to drive the first and second petals to at least one stationary operational intermediate position between a fully open position and a fully closed position and to maintain the first and second petals in the at least one stationary operational intermediate position, wherein the posterior petals of the first and second petals are spaced from the axis of the propulsive system such that a part of a jet from the jet engine is ejected between the posterior petals and another part of the jet from the jet engine is ejected by the anterior petals of the first and second petals to first and second sides and toward the front of the propulsive system.

* * * * *